United States Patent Office 3,051,585
Patented Aug. 28, 1962

3,051,585
PROTECTIVE COATINGS FOR POLYESTER RESINS
Alan E. Weinberg, Kenmore, Claude T. Bean, Niagara Falls, Paul Robitschek, Wilson, and Blaine O. Schoepfle, Niagara Falls, N.Y., assignors to Hooker Chemical Corporation, Niagara Falls, N.Y., a corporation of New York
No Drawing. Filed Dec. 2, 1958, Ser. No. 777,560
13 Claims. (Cl. 117—33.3)

This invention relates to compositions for the protection of resins, and more particularly refers to coating compositions which when applied to the surface of resinous articles comprising an unsaturated polyester resin and a vinylidene monomer will protect them from the deleterious effects of weathering, and which additionally will have good adherence to the surface of the resinous articles so protected. This invention also embraces the process for coating the resinous articles and the resinous articles having such coatings.

Resinous articles comprising an unsaturated polyester resin and a vinylidene monomer are subject to deterioration and to discoloration when exposed to natural outdoor conditions for prolonged periods of time, this is especially true of the resinous articles based on halogen-containing polyester resins which are the preferred compositions of the present invention. This deterioration and discoloration is in part due to the presence of ultraviolet light in the sun's radiation and in part due to temperature, humidity and other climatic conditions. Methods have been proposed for diminishing the effects of weathering by incorporating within the resinous articles an ultraviolet light absorbing material. These methods are quite costly and do not offer sufficient protection to the surface of the resinous article for many applications. In the weathering process it has been observed that the degradation occurs on the surface of the finished polyester article, the remainder being unaffected. This discoloration always occurs after a longer period of time than would be the case if no ultraviolet light absorbing material were present. The discoloration may then be removed from the surface by various methods, such as by sanding off and polishing, but if the material is re-exposed, the discoloration will reappear in the same period of time that it took for the original discoloration to appear. In order to overcome this, methods have been suggested whereby the ultraviolet light absorbing material is concentrated on the surface of the resinous article, such as by painting, spraying, etc., a coating containing the ultraviolet light absorbing material on the finished article. These methods suffer from the serious disadvantage that the operation must be conducted on the finished resinous article. It is not practical to apply conventional coatings in the plant where the resinous article is fabricated since in the manufacture, cellophane sheets, or other similar materials, adhere to the resinous article after its fabrication. These sheets are used to contain the resinous article during its manufacture, and, if removed after fabrication will allow the resinous article to be scratched or otherwise damaged during shipment and handling. In addition to this, the conventional coating methods frequently do not provide sufficient adherence of the coating compositions to the resinous articles.

It is, therefore, an object of the present invention to provide a method for protecting resinous articles comprising an unsaturated polyester resin and a vinylidene monomer from the effects of weathering.

It is a further object of the present invention to provide a method for the protection of such resinous articles which is inexpensive and simple to utilize.

It is a further object of the present invention to provide a method for the protection of such resinous articles by the use of an ultraviolet light absorbing material whereby the ultraviolet light absorbing material is concentrated on the surface of the resinous article to be protected.

It is a still further object of the present invention to provide a method for the protection of resinous articles by means of a light stabilized coating whereby the protective layer may be applied at the time of fabrication of the resinous article, thus enabling retention of the protective sheet used in fabrication.

It is a still further object to provide a method for the protection of resinous articles by means of a light stabilized coating whereby the protective layer attains excellent adherence to the resinous article, preferably by chemical combination of the light stabilized coating to the resinous article.

Further objects and advantages will appear herein.

It has now been found that a resinous article comprising an unsaturated polyester resin and a vinylidene monomer may be prepared which is protected from the effects of weathering by providing a coating composition thereupon, chemically combined with said resinous article and comprising a major portion of an unsaturated liquid polyester resin and a vinylidene monomer, and a minor portion of a hydrocarbon wax, an ultraviolet light stabilizer and a polymerization initiator.

The coating composition is generally prepared by simply intermixing the ingredients in the desired proportions. After addition of the polymerization initiator the coating composition is spread out upon any suitable self-supporting film, such as cellophane sheet, and allowed to gel. The coating composition may be spread out to the desired thickness by any suitable method, such as a roller, doctor blade, brush, spraying or by other appropriate methods. Thicknesses of from about 0.1 to about 25 mils are generally preferred. After gellation, the gelled side of the coated film is contacted with a copolymerizable composition comprising an unsaturated polyester resin and a vinylidene monomer. The coating composition may be placed upon the copolymerizable composition or the copolymerizable composition placed upon the coating composition. The copolymerizable composition may, of course, be protected between two of such coatings, or just one coating may be used. The coated resinous article is then cured, preferably at an elevated temperature.

The plastic article prepared by the above method has many advantages over the prior art. The light absorbing material is concentrated on the surface of the resinous article. The coating composition is chemically combined with the resinous article, thus providing an extremely adherent coating. In addition the cellophane film or other protective sheet upon which the coating composition is spread out may be retained throughout the curing process; said cellophane film need not be removed until immediately prior to use, thereby rendering the coated resinous article less prone to damage by shipping and handling. In addition to this the method of the present invention provides more stability to the deleterious effects of weathering than the methods of the prior art.

The resinous articles to be protected by the method of the present invention are copolymerized compositions comprising (A) an unsaturated polyester resin which is the reaction product of a polybasic acid and a polyhydric alcohol and (B) a vinylidene monomer. In the preparation of the unsaturated polyester resins of the present invention one should use the alpha, beta unsaturated polybasic acids such as: maleic; fumaric; aconitic; itaconic; monochloromaleic anhydride; and the like. These unsaturated acids should be present in at least twenty percent by weight of the total polybasic acid and preferably in between about twenty-five percent and sixty-five percent by weight of the total polybasic acid. In addition saturated polybasic acids may be used, that is, those which are free of non-benzenoid unsaturation. The preferred saturated polybasic acids of the present invention are those which are Diels-Alder adducts of hexahalocyclopentadiene for example: 1,4,5,6,7,7-hexachlorobicyclo-(2.2.1)-5-heptene-2,3-dicarboxylic acid; 1,4,5,6-tetrachloro-7,7-difluorobicyclo-(2.2.1)-5-heptene - 2,3 - dicarboxylic acid; 1,4,5,6,7,7-hexachloro-2-methylbicyclo-(2.2.1)-5-heptene-2,3 - dicarboxylic acid; 1,4,5,6,7,7-hexachlorobicyclo-(2.2.1)-5-heptene-2-acetic - 2 - carboxylic acid; 1,4,5,6,7,7-hexabromobicyclo-(2.2.1)-5-heptene - 2,3 - dicarboxylic acid; etc. Other saturated polybasic acids which may be employed include the following: phthalic; tetrachlorophthalic; oxalic; malonic; succinic; glutaric; sebacic; isosebacic adipic; etc. Mixtures of polybasic acids may also be used. The anhydrides of the above acids may also be used.

The preferred method employs a saturated polybasic acid which is a Diels-Alder adduct of hexahalocyclopentadiene. Alternatively, we may employ a polyhydric alcohol which is a Diels-Alder adduct of hexahalocyclopentadiene. Typical adducts include: 2,3-dimethylol-1,4,5,6,7,7-hexachlorobicyclo - (2.2.1) - 5 - heptene; 2,3-dimethylol - 1,4,5,6 - tetrachloro - 7,7 - difluorobicyclo-(2.2.1)-5-heptene; etc. These compounds are disclosed in copending application SN 308,922 for "Polyhalogen-Containing Polyhydric Compounds," filed September 10, 1952, now U.S. Patent 3,007,958.

It is preferred to employ polyhydric alcohols having only two hydroxy groups, although minor amounts of alcohols having three or more hydroxy groups may be employed. Among the dihydroxy alcohols which may be used are the following: ethylene glycol; 1,2-propylene glycol; 1,3 - propylene glycol; diethylene glycol; dipropylene glycol; 1,4-butanediol; 1,3-butanediol; 1,2-butanediol; 1,2 - pentanediol; 1,3 - pentanediol; 1,4-pentanediol; 1,5-pentanediol; 1,6-hexanediol; neopentyl glycol; and the like. Among the other polyhydroxy alcohols which may be employed are the following; glycerol; hexanetriol; butanetriol; trimethylol propane; trimethylol ethane; pentaerythritol; dipentaerythritol and the like. Mixtures of polyhydric alcohols may also be used. The ratio of the polyhydric alcohol to the polybasic acid may be expressed as the hydroxylcarboxyl ratio, and this ratio may be varied over a wide range. Generally however, a hydroxyl-carboxyl ratio of at least one is preferred.

Any vinylidene monomer may be employed, that is, any compound containing a polymerizable $CH_2=C<$ group, for example: styrene; vinyl toluene; divinyl compounds such as divinyl benzene, etc.; polyallyl compounds such as diallyl phthalate, diallyl maleate, triallyl phosphate, diallyl 1,4,5,6,7,7 - hexachlorobicyclo-(2.2.1)-5-heptene-2,3-dicarboxylate; etc.; and unsaturated esters of acids such as acrylic and methacrylic acid and maleic, itaconic, etc. The proportion of monomer to unsaturated polyester resin may be varied over a wide range, depending on the compounds employed and the properties desired. Generally, from about five percent to about seventy percent of monomer based on weight of the polyester is preferred.

It is understood that in order to form an interpolymerizable mixture from polyesters and monomers, it is usually preferable to employ the polyester relatively hot, e.g., at a temperature within the range of about seventy-five degrees centigrade to one hundred and fifty degrees centigrade and in order to effect mixture of the components at such temperatures, without danger of gelation, as well as for purposes of obviating gelation during subsequent storage of the mixture, it is usually desirable to incorporate into the polyester a suitable gelation inhibitor, for example hydroquinone, chloranil, picric acid, and other suitable compounds known to the art.

Light stabilizers may, if desired, be incorporated into the copolymerizable mixture.

Various unsaturated liquid polyester resins may be employed in the coating composition, the only requirement being that they be flowable at ambient temperatures. Generally, the non-chlorine-containing polyester resins are preferred they are more light stable. Unsaturated polyester resins employed are the reaction products of a polybasic acid and a polyhydric alcohol. The alpha, beta unsaturated polybasic acids should be present in at least twenty percent by weight of the total polybasic acid, and preferably in between about twenty-five percent and sixty-five percent by weight of the total polybasic acid. Typical alpha, beta unsaturated polybasic acids include: maleic; fumaric; aconitic; itaconic; monochloromaleic anhydride; and the like. In addition the saturated polybasic acids may be used, that is, those which are free of non-benzenoid unsaturation such as: phthalic; tetrachlorophthalic; oxalic; malonic; succinic; glutaric; sebacic; isosebacic; adipic; 1,4,5,6,7,7 - hexachlorobicyclo - (2.2.1)-5-heptene-2,3-dicarboxylic acid; 1,4,5,6-tetrachloro-7-7-difluorobicyclo - (2.2.1)-5-heptene-2,3-dicarboxylic acid; 1,4,5,6,7,7 - hexachloro - 2 - methylbicyclo - (2.2.1)-5-heptene-2,3-dicarboxylic acid; 1,4,5,6,7,7-hexachlorobicyclo-(2.2.1)-5-heptene - 2 - acetic - 2 - carboxylic acid; 1,4,5,6,7,7 - hexabromobicyclo - (2.2.1)-5-heptene-2,3-dicarboxylic acid; and the like.

It is preferred to employ polyhydric alcohols having only two hydroxy groups, although minor amounts of alcohols having three or more hydroxy groups may be employed. Among the dihydroxy alcohols which may be used are the following: ethylene glycol; 1,2-propylene glycol; 1,3-propylene; diethylene glycol; dipropylene glycol; 1,4-butanediol; 1,3-butanediol; 1,2-butanediol; 1,2-pentanediol; 1,3 - pentanediol; 1,4 - pentanediol; 1,5-pentanediol; 1,6-hexanediol; neopentyl glycol; and the like. Among the other polyhydroxy alcohols which may be employed are the following: glycerol; hexanetriol; butanetriol; trimethylol propane; trimethylol ethane; pentaerythritol; dipentaerythritol and the like. Mixtures of polyhydric alcohols may also be used. Additionally a polyhydric alcohol may be employed which is a Diels-Alder adduct of hexahalocyclopentadiene, such as 2,3-dimethylol-1,4,5,6,7,7 - hexachlorobicyclo - (2.2.1) - 5-heptene; 2,3-dimethylol-1,4,5,6-tetrachloro-7,7-difluorobicyclo-(2.2.1)-5-heptene; etc.

The ratio of polybasic acid to polyhydric alcohol may be expressed as hydroxyl-carboxyl ratio, and may vary over a wide range. Generally, however, a hydroxyl-carboxyl ratio of at least one is preferred. The ratio of unsaturated liquid polyester employed will vary depending upon other ingredients employed and viscosity of coating composition desired.

Any vinylidene monomer may be employed, that is any compound containing a polymerizable $CH_2=C<$ group, for example: styrene, vinyl toluene; divinyl compounds such as divinyl benzene, etc.; polyallyl compounds such as diallyl phthalate, diallyl maleate, triallyl phosphate, diallyl 1,4,5,6,7,7-hexachlorobicyclo-(2.2.1) - 5 - heptene-2,3-dicarboxylate; etc.; and unsaturated esters of acids such as acrylic and methacrylic acid and maleic, itaconic, etc. The proportion of monomer to unsaturated polyester resin may be varied over a wide range, depending on the compounds employed and the properties desired. Generally, from about five percent to about seventy percent of monomer based on weight of the polyester is preferred.

It is understood that in order to form an interpolymerizable mixture from polyesters and monomers, it is usually preferable to employ the polyester relatively hot, e.g., at a temperature within the range of about seventy-five degrees centigrade to one hnudred and fifty degrees centigrade and in order to effect mixture of the components at such temperatures without danger of gelation, as well as for purposes of obviating gelation during subsequent storage of the mixture, it is usually desirable to incorporate into the polyester a suitable gelation inhibitor, for example hydroquinone, chloranil, picric acid, and other suitable compounds known to the art.

A hydrocarbon wax is generally employed in the coating composition to prevent atmospheric oxygen from retarding the surface curing of the coating. The hydrocarbon waxes migrate to the surface of the coating, thus providing thin layers that exclude oxygen until after the films have hardened. When so protected from the retarding effects of oxygen, the coating compositions have cold curing characteristics, i.e., they will cure within a relatively short period of time without application of heat from an external source. A wide variety of hydrocarbon waxes may be employed for this purpose. The preferred hydrocarbon waxes are: paraffin; montan; ozocerite; ceresin; and mixtures thereof. Other materials may be employed such as: beeswax; carnauba; sugar cane wax; polyethylene wax; etc. The proportion of hydrocarbon wax employed will vary depending on the solubility of the wax in the entire coating composition.

The normal polymerization initiators which may be employed in the present invention are the peroxide catalysts such as tertiary butyl peroxide; methyl ethyl ketone peroxide; cumene hydroperoxide; benzoyl peroxide; etc. The amount of initiator used will vary from 0.1 to about five percent by weight of the coating composition.

An accelerator is usually desirable to increase the speed of gelation. Suitable accelerators include: metallic driers such as lead, cobalt, manganese, vanadium, and iron in the form of salts such as octoates, naphthenates, gallates, tallates, etc.; amines such as N,N-dimethyl aniline; mercaptans such as dodecyl mercaptan, etc.; and the like.

The preferred ultraviolet light stabilizers are those of the 2-hydroxybenzophenone series. Illustrative of these are 2,4 - dihydroxybenzophenone; 2,2',4 - trihydroxy - 4'-methoxybenzophenone; 2,2'-dihydroxy - 4,4' - dimethoxybenzophenone; 2,2',4,4'-tetrahydroxybenzophenone; 2-hydroxy-5-chlorobenzophenone; 2-hydroxy-2,5'-dichlorobenzophenone; 2 - hydroxy-5-methyl-2'-chlorobenzophenone; 2 - hydroxy-5,3',4' - trichlorobenzophenone; 2-hydroxy-5-methylbenzophenone; 2-hydroxy-2'-chlorobenzophenone; 2-hydroxy-5-chlorobenzophenone-2'-carboxylic acid; 2-hydroxy - 4 - methoxybenzophenone; 2 - hydroxy - 4,4'-dimethoxybenzophenone; 2 - hydroxy - 4 - chlorobenzophenone; and the like. Other ultraviolet light stabilizers that may be employed include the following: salicylates; substituted benzotriazoles; dibenzoyl resorcinol and the like. The proportion of light stabilizer may vary from .01 to twenty percent based on the weight of the total coating composition, but from 0.5 to five percent is generally preferred.

The coating composition thus prepared is spread upon a film to the desired thickness. The coating composition may be spread upon any suitable film, preferably cellulosic materials such as cellophane, cloth, wood, paper, etc. The coating composition is then allowed to gel; this is preferably done by allowing the coating composition to stand open to the atmosphere, although heating may be used to speed gelation. Gelation time will vary depending upon thickness of the film desired and the ingredients employed. Generally however, from one to sixty minutes is required. After the coating composition has gelled, the coating composition and film are placed upon the polymerizable mixture.

The coated copolymerizable composition thus obtained is then heated at an elevated temperature, thereby simultaneously curing said coated copolymerizable composition and obtaining chemical combination of the coating composition and the copolymerizable composition. This may be done by any suitable manner known to the art, for example, placing the coated composition in a heated forced draft oven. The temperature of the cure will vary depending upon time and cure required, and ingredients employed. Generally speaking however, a temperature of from about fifty to about one hundred and fifty degrees centigrade may be employed, while the preferred temperature range is from about seventy to about ninety degrees centigrade. Similarly, the time of cure will vary depending upon the cure required, temperature of the cure and ingredients employed.

The coated composition thus obtained is extremely light stable and the coating is transparent and exceptionally adherent. Various modifications of the previous formulations will be apparent to those skilled in the art.

The following examples will serve to illustrate the present invention and the improvements resulting therefrom.

In order to allow for consistent and uniform results, so that comparisons may be made, an accelerated procedure for evaluating weather resistance was employed which involved exposing standardized 3″ x 9″, one-ply, glass fiber laminates (Owens-Corning Fiberglas Corporation Mat No. 216B) containing about thirty percent by weight glass and about seventy percent by weight resin in an accelerated weathering device, model (XW) manufactured by the Atlas Electric Devices Company, Inc., Chicago, Illinois, and sold under their trademark, Weather-O-Meter. Weathering tests were run using an uncoated laminate containing an ultraviolet stabilizer and a laminate coated according to the present invention. Weathering tests were also run under natural outdoor conditions.

*Example 1*

An unsaturated polyester resin was prepared by esterifying about fifty-three parts of ethylene glycol and ninety parts of diethylene glycol with about three hundred and ninety-five parts of 1,4,5,6,7,7-hexachlorobicyclo-(2.2.1)-5-heptene-2,3-dicarboxylic anhydride (which was prepared by the Diels-Alder reaction of hexachlorocyclopentadiene with maleic anhydride) and about seventy-one parts of maleic anhydride. About thirty parts of styrene and about one hundred parts of product produced by the esterification reaction were mixed together until complete solution was attained to give a clear, substantially colorless solution of liquid polyester resin having a viscosity of about thirty poises at twenty-five degrees centigrade on a Gardner bubble viscometer and having a chlorine content of about thirty percent by weight of the total.

*Example 2*

To one hundred parts of the unsaturated polyester resin prepared in Example 1 was added one part of 2-hydroxy-4-methoxybenzophenone. A glass laminate was prepared in accordance with the aforementioned method and the resulting mixture polymerized, in the presence of a catalyst consisting of about two percent by weight of a mixture containing fifty percent by weight of benzoyl peroxide in tricresyl phosphate, by heating to a temperature of about ninety-five degrees centigrade for about twenty minutes on an open bed hydraulic press and twelve hours at eighty degrees centrigrade in a forced draft oven.

The laminate thereby obtained was exposed for one thousand hours in a Weather-O-Meter, after which time the surface showed marked discoloration and severe surface erosion.

*Example 3*

A liquid unsaturated polyester resin was prepared by co-reacting one mole of fumaric acid, one mole of adipic acid, and 2.1 moles of propylene glycol. When esterification is substantially complete, as indicated by an acid number of thirty to forty, there was added styrene in an amount to equal one-half of the polyester present and 0.01 percent by weight of hydroquinone based on the total weight of the polyester resin and styrene.

To one hundred parts of the above product was added two parts of 2-dibenzoyl resorcinol, 0.25 part of cobalt naphthenate (six percent cobalt), 0.7 part of a ten percent solution of ceresin wax in styrene, and 2.5 parts of methyl ethyl ketone peroxide catalyst. This mixture was sprayed on a cellophane film in a section approximately one and one-half mils thick, and allowed to gel. After one hour at room temperature, a laminate was prepared on the gel coated film using glass fiber mat and an unsaturated liquid polyester resin prepared according to Example 1 and containing one percent benzoyl peroxide as a polymerization catalyst. This laminate was cured for twenty minutes at ninety-five degrees centigrade on an open bed hydraulic press and twelve hours at eighty degrees centigrade in a forced draft oven.

The laminate thereby obtained was exposed for one thousand hours in a Weather-O-Meter, after which time the surface showed little discoloration and no surface erosion.

*Example 4*

A liquid unsaturated polyester resin was prepared by co-reacting one mole of phthalic anhydride, one mole of maleic anhydride, and 2.2 moles of propylene glycol. When esterification is substantially complete, as indicated by an acid number of thirty to forty, there was added styrene in an amount equal to one-half of the polyester present and 0.01 percent by weight of hydroquinone based on the total weight of the polyester resin and styrene.

To one hundred parts of the above product was added one part of 2-hydroxy-4-methoxybenzophenone, one part paraffin wax, 0.4 part of cobalt naphthenate (six percent cobalt), and three parts of methyl ethyl ketone peroxide catalyst. This mixture was spread on a cellophane film in a five mil thick section with a doctor blade. The coating was allowed to gel for forty minutes at room temperature. A laminate was then prepared between two such gel coated films using glass fiber mat and an unsaturated liquid polyester resin prepared according to Example 1 and containing two percent by weight of a mixture containing fifty percent by weight of benzoyl peroxide in tricresyl phosphate as a polymerization catalyst. This laminate was cured for thirty minutes at eighty degrees centigrade and one hour at one hundred and twenty degrees centigrade in a forced draft oven.

The laminate thereby obtained was exposed for one thousand hours in a Weather-O-Meter, after which the surface showed little discoloration and no surface erosion.

*Example 5*

A laminate was prepared in a manner after Example 4. The laminate was exposed for eight months under natural outdoor conditions, after which time the surface showed little discoloration and no surface erosion. In contrast, an uncoated laminate of the same composition was exposed under natural outdoor conditions for eight months, after which time the surface showed marked discoloration and severe surface erosion.

*Example 6*

A liquid unsaturated polyester resin was prepared by co-reacting one mole of phthalic anhydride, one mole of fumaric acid and 1.1 moles of 1,3-butanediol. When esterification was substantially complete, as indicated by an acid number of thirty to forty, there was added styrene in an amount equal to one-third of the polyester present and 0.01 percent by weight of hydroquinone based on the total weight of the polyester resin and styrene. After cooling to room temperature, 0.047 mole of 2-hydroxy-4-methoxybenzophenone was added.

To one hundred parts of the above mixture was added ten parts of a styrene solution containing 0.45 part of ceresin wax and 0.02 part of montan wax, 0.15 part of cobalt naphthenate (six percent cobalt), 0.11 part N,N-dimethylaniline, and 3.3 parts of methyl ethyl ketone peroxide catalyst. This mixture was spread on a cellophane film in a two mil thick section with a coating roller and allowed to gel. After a few minutes at room temperature a laminate was prepared between two such gel coated films using glass fiber mat and an unsaturated liquid polyester resin prepared according to Example 1 and containing a polymerization catalyst. This laminate was cured for thirty minutes at eighty degrees centigrade and one hour at one hundred and twenty degrees centigrade in a forced draft oven.

The laminate thereby obtained was exposed for one thousand hours in a Weather-O-Meter after which time the surface showed little discoloration and no surface erosion.

*Example 7*

An unsaturated polyester resin was prepared by co-reacting one mole of phthalic anhydride, one mole of maleic anhydride, and 2.2 moles of propylene glycol. When esterification is substantially complete, as indicated by an acid number of thirty to forty, there was added styrene in an amount equal to one-half of the polyester present and 0.01 percent by weight of hydroquinone based on the total weight of the polyester resin and styrene, to give a clear, substantially colorless solution.

*Example 8*

To one hundred parts of the unsaturated polyester resin prepared in Example 7 was added 0.2 part of 2-hydroxy-4-methoxybenzophenone. A glass laminate was prepared in accordance with the aforementioned method and the resulting mixture polymerized in the presence of a catalyst consisting of about two percent by weight of a mixture containing fifty percent by weight of benzoyl peroxide in tricresyl phosphate, by heating to a temperature of about ninety-five degrees centigrade for about twenty minutes on an open bed hydraulic press nad twelve hours at eighty degrees centrigate in a forced draft oven.

The laminate thereby obtained was exposed for one thousand hours in a Weather-O-Meter, after which time the surface showed slight discoloration and moderate surface erosion.

*Example 9*

A liquid unsaturated polyester resin was prepared by co-reacting one mole of fumaric acid, one mole of adipic acid, and 2.1 moles of propylene glycol. When esterification is substantially complete, as indicated by an acid number of thirty to forty, there was added styrene in an amount to equal one-half of the polyester present and 0.01 percent by weight of hydroquinone based on the total weight of the polyester resin and styrene.

To one hundred parts of the above product was added two parts of 2-dibenzoyl resorcinol, 0.25 part of cobalt naphthenate (six percent cobalt), 0.7 part of a ten percent solution of ceresin wax in styrene, and 2.5 parts of methyl ethyl ketone peroxide catalyst. This mixture was sprayed on a cellophane film in a section approximately one and one-half mils thick, and allowed to gel. After one hour at room temperature, a laminate was prepared on the gel coated film using glass fiber mat and an unsaturated liquid polyester resin prepared according to Example 7 and containing one percent benxoyl peroxide as a polymerization catalyst. This laminate was cured for twenty minutes at ninety-five degrees centigrade on an open bed hydraulic press, and twelve hours at eighty degrees centigrade in a forced draft oven.

The laminate thereby obtained was exposed for one thousand hours in a Weather-O-Meter, after which time the surface showed little discoloration and no surface erosion.

It is noted that while the preferred embodiment of the present invention includes the hydrocarbon waxes in the coating composition, they are not necessary to the process of the present invention; this is especially true when thicker coating compositions are used. This is due to the heat of exotherm of the resin not being dissipated into its surroundings, as is the case in thinner sections. It is, of course, noted that by hydrocarbon waxes we are intending to include all waxy materials that prevent atmospheric oxygen retardation of surface curing.

Polyester resins are preferred in the coating composition of the present invention; however, the process of the present invention may be modified to allow for utilization of other resins as the basis of the coating composition, such as epoxy resins, urethane resins and oil modified alkyd resins.

In curing the coated composition of the present invention it is preferred to use elevated temperatures as heretofore indicated; however, room temperature curing may be used to harden the coated composition.

This invention may be embodied in other forms or carried out in other ways without departing from the spirit or essential characteristics thereof. Various modifying agents may be employed to accentuate any given characteristics, such as for example, film continuity may be enhanced by the use of a small amount of binding agents, such as silicone resins, melamine resins, various colorants may be added, etc. The present embodiment is, therefore, to be considered as in all respects, illustrative, and not restrictive, the scope of the invention being indicated by the appended claims, and all changes which come within the meaning and range of equivalence are intended to be embraced therein.

We claim:

1. A method for forming a plastic article with a weather-resistant, adherent, transparent coating, chemically combined in said plastic article, which comprises: (I) mixing together a coating composition comprising (A) a major portion of an unsaturated liquid polyester resin and a vinylidene monomer, and (B) a minor portion of a hydrocarbon wax, an ultraviolet light stabilizer and a polymerization initiator; (II) spreading said coating composition upon a self-supporting film to a thickness of from about 0.1 to about 25 mils and allowing said coating composition to gel; (III) contacting the gelled side of the coated self-supporting film and a copolymerizable composition comprising (A) an unsaturated polyester resin and (B) an vinylidene monomer; and (IV) heating the resulting coated composition at an elevated temperature, thereby simultaneously curing said coated composition and obtaining chemical combination of the coating composition and the copolymerizable composition.

2. A plastic article comprising: (I) a copolymerized composition comprising (A) an unsaturated polyester resin and (B) a vinylidene monomer; and (II) a weather-resistant, adherent, transparent coating, chemically combined with said copolymerized composition, said coating composition comprising (A) a major portion of an unsaturated liquid polyester resin and a vinylidene monomer, and (B) a minor portion of a hydrocarbon wax, an ultraviolet light stabilizer and a polymerization initiator; said article having been produced in accordance with the method of claim 1.

3. A method for forming a plastic article with a weather-resistant, adherent, transparent coating, chemically combined in said plastic article, which comprises: (I) mixing together a coating composition comprising (A) a major portion of an unsaturated liquid polyester resin and a vinylidene monomer, and (B) a minor portion of a hydrocarbon wax, an ultraviolet light stabilizer and a polymerization initiator; (II) spreading said coating composition upon a self-supporting film to a thickness of from about 0.1 to about 25 mils and allowing said coating composition to gel; (III) contacting the gelled side of the coated self-supporting film and a copolymerizable composition comprising (A) a halogen-containing unsaturated polyester resin and (B) a vinylidene monomer; and (IV) heating the resulting coated composition at an elevated temperature, thereby simultaneously curing said coated composition and obtaining chemical combination of the coating composition and the copolymerizable composition.

4. A plastic article comprising (I) a copolymerized composition comprising (A) a halogen-containing unsaturated polyester resin and (B) a vinylidene monomer; and (II) a weather-resistant, adherent, transparent coating, chemically combined with said copolymerized composition comprising (A) a major portion of an unsaturated liquid polyester resin and a vinylidene monomer, and (B) a minor portion of a hydrocarbon wax, an ultraviolet light stabilizer and a polymerization initiator, said article having been produced in accordance with the method of claim 3.

5. A method for forming a plastic article with a weather-resistant, adherent, transparent coating, chemically combined in said plastic article, which comprises: (I) mixing together a coating composition comprising (A) a major portion of an unsaturated liquid polyester resin and a vinylidene monomer, and (B) a minor portion of a hydrocarbon wax, an ultraviolet light stabilizer and a polymerization initiator; (II) spreading said coating composition upon a self-supporting film to a thickness of from about 0.1 to about 25 mils and allowing said coating composition to gel; (III) contacting the gelled side of the coated self-supporting film and a copolymerizable composition comprising (A) a halogen-containing unsaturated resinous reaction product of a polybasic acid and a polyhydric alcohol wherein said polybasic acid is a Diels-Alder adduct of hexahalocyclopentadiene and (B) a vinylidene monomer; and (IV) heating the resulting coated composition at an elevated temperature, thereby simultaneously curing said coated composition and obtaining chemical combination of the coating composition and the copolymerizable composition.

6. A plastic article comprising: (I) a copolymerized composition comprising (A) a halogen-containing unsaturated resinous reaction product of a polybasic acid and a polyhydric alcohol wherein said polybasic acid is a Diels-Alder adduct of hexahalocyclopentadiene and (B) a vinylidene monomer; and (II) a weather-resistant, adherent, transparent coating, chemically combined with said copolymerized composition, said coating composition comprising (A) a major portion of an unsaturated liquid polyester resin and a vinylidene monomer, and (B) a minor portion of a hydrocarbon wax, an ultraviolet light stabilizer and a polymerization initiator, said article having been produced in accordance with the method of claim 5.

7. A method for forming a plastic article with a weather-resistant, adherent, transparent coating, chemically combined in said plastic article which comprises: (I) mixing together a coating composition comprising (A) a major portion of an unsaturated liquid resinous reaction product of a polybasic acid and a polyhydric alcohol and a vinylidene monomer, and (B) a minor portion of a hydrocarbon wax, a 2-hydroxybenzophenone as an ultraviolet light stabilizer and a polymerization initiator; (II) spreading said coating composition upon a self-supporting film to a thickness of from about 0.1 to about 25 mils and allowing said coating composition to gel; (III) contacting the gelled side of the coated self-supporting film and a copolymerizable composition comprising (A) a halogen containing unsaturated resinous reaction product of a polybasic acid and polyhydric alcohol wherein said polybasic acid is a Diels-Alder adduct of hexahalocyclopentadiene and (B) a vinylidene monomer; and (IV) heating the resulting coated composition at an elevated temperature, thereby simultaneously curing said coated composition and obtaining chemical combination of the coating composition and the copolymerizable composition.

8. A plastic article comprising: (I) a copolymerized composition comprising (A) a halogen-containing unsaturated resinous reaction product of a polybasic acid and a polyhydric alcohol wherein said polybasic acid is a Diels-Alder adduct of hexahalocyclopentadiene and (B) a vinylidene monomer; and (II) a weather-resistant, adherent, transparent coating in a thickness of from about 0.1 to about 25 mils, and chemically combined with said copolymerized composition, said coating composition comprising (A) a major portion of an unsaturated liquid resinous reaction product of a polybasic acid and a polyhydric alcohol, and a vinylidene monomer; and (B) a minor portion of a hydrocarbon wax, a 2-hydroxybenzophenone as an ultraviolet light stabilizer, and polymerization initiator, and (III) a removable self-supporting film in contacting relationship with said coating composition; said article having been produced in accordance with the method of claim 7.

9. A method for forming a plastic article with a weather-resistant, adherent, transparent coating, chemically combined in said plastic article, which comprises: (I) mixing together a coating composition comprising (A) a major portion of an unsaturated liquid polyester resin and a vinylidene monomer, and (B) a minor portion of an ultraviolet light stabilizer and a polymerization initiator; (II) spreading said coating compostiion upon a self-supporting film to a thickness of from about 0.1 to about 25 mils and allowing said coating composition to gel; (III) contacting the gelled side of the coated self-supporting film and a copolymerizable composition comprising (A) an unsaturated polyester resin and (B) a vinylidene monomer; and (IV) hardening said coated composition, thereby simultaneously curing the resulting coated composition and obtaining chemical combination of the coating composition and the copolymerizable composition.

10. A plastic article comprising: (I) a copolymerized composition comprising (A) an unsaturated polyester resin and (B) a vinylidene monomer; and (II) a weather-resistant, adherent, transparent coating, chemically combined with said copolymerized composition, said coating composition comprising (A) a major portion of an unsaturated liquid polyester resin and a vinylidene monomer, and (B) a minor portion of an ultraviolet light stabilizer and a polymerization initiator; said article having been produced in accordance with the method of claim 9.

11. A plastic article comprising (I) a copolymerized composition comprising (A) an unsaturated polyester resin and (B) a vinylidene monomer; (II) a weather-resistant, adherent, transparent coating chemically combined with said copolymerized composition, said coating composition comprising (A) a major portion of an unsaturated liquid polyester resin and a vinylidene monomer, and (B) a minor portion of an ultraviolet light stabilizer, and a polymerization initiator, and (III) a removable self-supporting film in contacting relationship with said coating composition; said article having been produced in accordance with the method of claim 9.

12. A method for forming a plastic article with a weather-resistant, adherent, transparent coating, chemically combined in said plastic article which comprises: (I) spreading a coating compostiion comprising (A) a major portion of an unsaturated liquid polyester resin and a vinylidene monomer, and (B) a minor portion of an ultraviolet light stabilizer, and a polymerization initiator, upon a cellophane film to a thickness of from about 0.1 to about 25 mils and allowing said coating composition to gel; (II) contacting the gelled side of the coated cellophane film and a copolymerizable composition comprising (A) an unsaturated polyester resin and (B) a vinylidene monomer; and (III) heating the resulting coated composition at an elevated temperature, thereby simultaneously curing said coated composition and obtaining chemical combination of the coating composition and the copolymerizable composition.

13. A plastic comprising: (I) a copolymerized composition comprising (A) an unsaturated polyester resin and (B) a vinylidene monomer; (II) a weather-resistant, adherent, transparent coating chemically combined with said copolymerized composition, said coating composition comprising (A) a major portion of an unsaturated liquid polyester resin and a vinylidene monomer, and (B) a minor portion of an ultraviolet light stabilizer and a polymerization initiator; and (III) a removable cellophane film in contacting relationship with said coating composition; wherein said coating composition is gelled prior to application to said copolymerizable composition; said article having been produced in accordance with the method of claim 12.

References Cited in the file of this patent

UNITED STATES PATENTS

| | | |
|---|---|---|
| 2,043,860 | Morgan | June 9, 1936 |
| 2,686,812 | Wynn et al. | Aug. 17, 1954 |
| 2,727,843 | Tillyer | Dec. 20, 1955 |
| 2,742,445 | Lum | Apr. 17, 1956 |
| 2,817,619 | Bickel et al. | Dec. 24, 1957 |
| 2,829,120 | Parker | Apr. 1, 1958 |
| 2,920,978 | Randall | Jan. 12, 1960 |
| 2,927,867 | Hings | Mar. 8, 1960 |